United States Patent [19]
Hsieh et al.

[11] Patent Number: 5,546,334
[45] Date of Patent: Aug. 13, 1996

[54] NOTEBOOK COMPUTER SYSTEM WITH A SEPARABLE TRACKBALL

[75] Inventors: Rong-Ya Hsieh, Chang-Hwa County; Jinn-Maw Lin, Taipei; Chun-Yen Hong, Taipei County, all of Taiwan

[73] Assignee: Acer Incorporated, Taipei, Taiwan

[21] Appl. No.: 38,937

[22] Filed: Mar. 29, 1993

[51] Int. Cl.⁶ .............................. G06F 3/00; H05K 5/00; H05K 7/00; G09G 5/08
[52] U.S. Cl. ..................... 364/709.11; 361/680; 345/167
[58] Field of Search .......................... 364/708.1, 709.01, 364/709.11, 709.12; 361/680; 345/167, 168, 905

[56] References Cited

U.S. PATENT DOCUMENTS

| | | | |
|---|---|---|---|
| 4,736,191 | 4/1988 | Matzke et al. | 340/365 |
| 4,913,387 | 4/1990 | Tice | 248/639 |
| 5,049,863 | 9/1991 | Oka | 364/709.01 |
| 5,168,427 | 12/1992 | Clancy et al. | 361/680 |
| 5,187,468 | 2/1993 | Garthwaite et al. | 345/905 |
| 5,268,675 | 12/1993 | Garthwaite et al. | 345/168 |
| 5,287,245 | 2/1994 | Lucente et al. | 361/680 |
| 5,355,357 | 10/1994 | Yamamori et al. | 361/680 |

OTHER PUBLICATIONS

"Access Method For Feature Expansion", IBM Technical Disclosure Bulletin, vol. 29 No. 8 Jan. 1987.

*Primary Examiner*—Roy N. Envall, Jr.
*Assistant Examiner*—Emmanuel L. Moise
*Attorney, Agent, or Firm*—Townsend and Townsend and Crew

[57] ABSTRACT

A notebook computer system with an easily separable trackball to give the system flexibility. The system makes use of a separable keyboard to achieve the goal of installing and separating the trackball. To this end the notebook computer comprises a keyboard that is able to be at least partially separated from the system, a socket for installation of the trackball module, with the trackball module being partially captured under the keyboard when installed in the socket. A notebook computer having a socket for accommodating a trackball may alternatively be provided with a plain plate, which allows the notebook computer to work normally without the trackball.

19 Claims, 6 Drawing Sheets

NOTEBOOK COMPUTER SYSTEM WITH A SEPARABLE TRACKBALL

BACKGROUND OF THE INVENTION

This invention relates generally to pointing devices for computers, and more specifically to an easily separable trackball in a notebook computer system.

The design trend of computers has been toward making them compact and mobile, and very powerful notebook-sized computer systems (notebook computers) have been developed. Many modern notebook computers have a trackball to simulate the functions of the "mouse" device in a desktop computer. In many such notebook computers, the trackball and the keyboard are integrated as one unit and the trackball is positioned in front of the keyboard. FIG. 1 shows a prior art notebook computer 100 with a built-in trackball 102. In such a notebook computer, the trackball cannot be separated from the computer.

For convenience and versatility, notebook computers with separable trackballs have been supplied to the market. One typical notebook computer 201 having a separable trackball assembly 202 is shown in FIGS. 2A and 2B. A trackball 203 is placed in the center of assembly 202. This trackball assembly can either be fit together with the body portion holding the keyboard 204 to form a whole, or can be separated from the body portion that holds the keyboard 204. In the latter case, notebook computer 201 still works normally, only without the functions of the trackball.

SUMMARY OF THE INVENTION

The present invention provides a notebook computer having an easily separable trackball module.

In short, the present invention allows the trackball module to be separable through the use of a separable keyboard. To this end the notebook computer of the present invention comprises a keyboard that is able to be at least partially separated from the system, a socket for installation of the trackball module, with the trackball module being partially captured under the keyboard when installed in the socket, and the trackball being separable from the system after being installed in the socket.

A further understanding of the nature and advantages of the invention will become apparent by reference to the remaining portions of the specification and drawings.

DESCRIPTION OF SPECIFIC EMBODIMENTS

Figure 3:
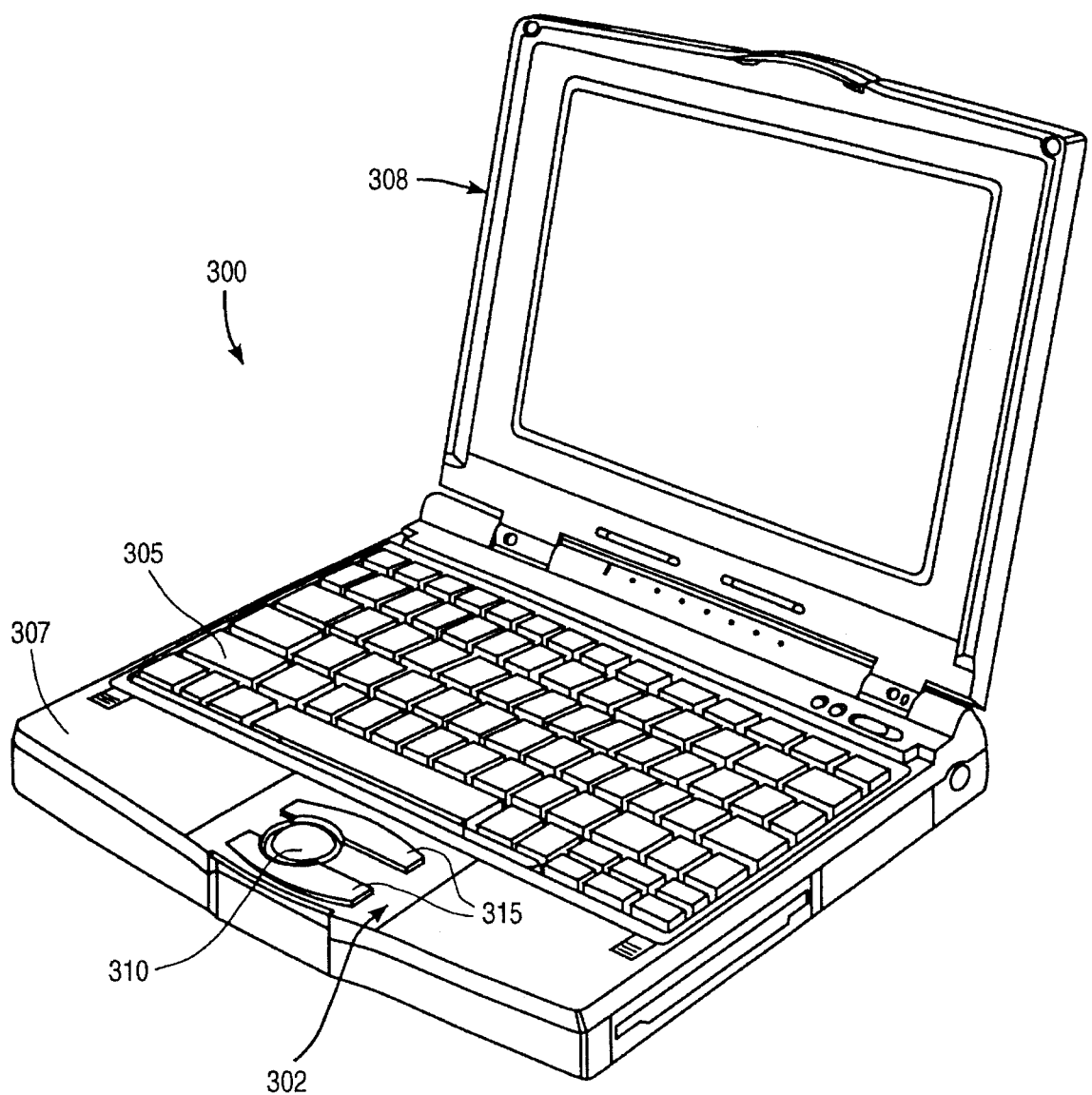
FIG. 3 shows a preferred embodiment of a notebook computer according to the present invention.

FIG. 3 is a perspective view of a preferred embodiment of a notebook computer 300 according to the present invention. Computer 300 has a trackball module 302 and a keyboard 305. In accordance with known practice, the computer includes a normally horizontal body portion 307 that houses the computer's electronic components and supports the trackball and keyboard. The computer also includes a hinged top portion 308, which supports the display screen. The trackball module includes a trackball 310 and a pair of functional buttons 315 for actuation by the user.

Figure 4:
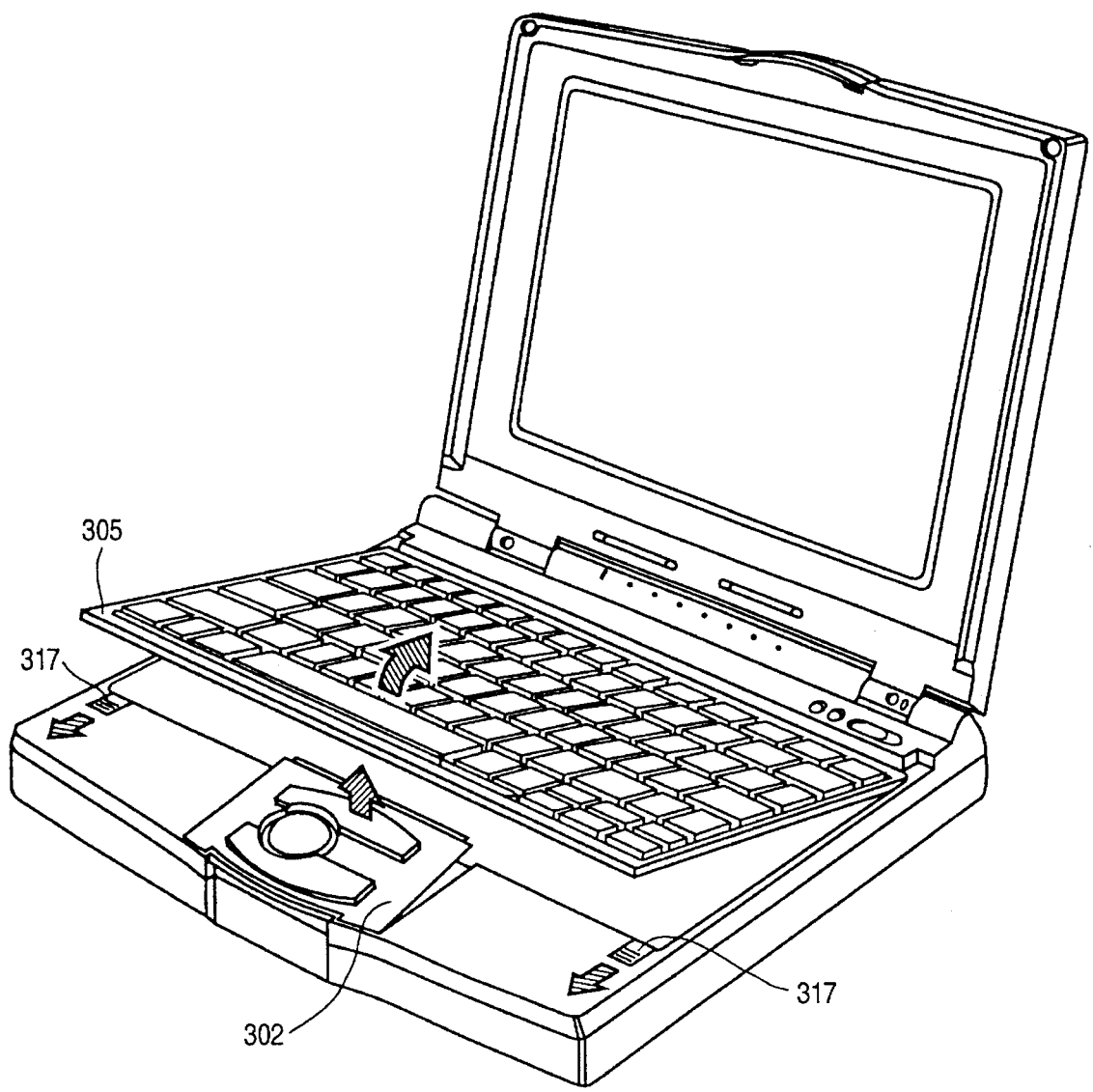
FIG. 4 shows the procedure for separating the trackball module from the notebook computer of FIG. 3.

FIG. 4 shows how the trackball module can be separated from the remaining portions of the computer. The notebook computer is constructed such that keyboard 305 is partially separable. As can be seen, the keyboard pivots upwardly when a pair of sliding buttons 317 are moved outwardly to release a keyboard lock (not shown). A cable connector (not shown) provides for data communication between the circuitry of trackball module 302 and that of the computer system. This cable connector is disconnected, after which trackball module 302 is easily separated from the rest of the computer.

Figure 5:
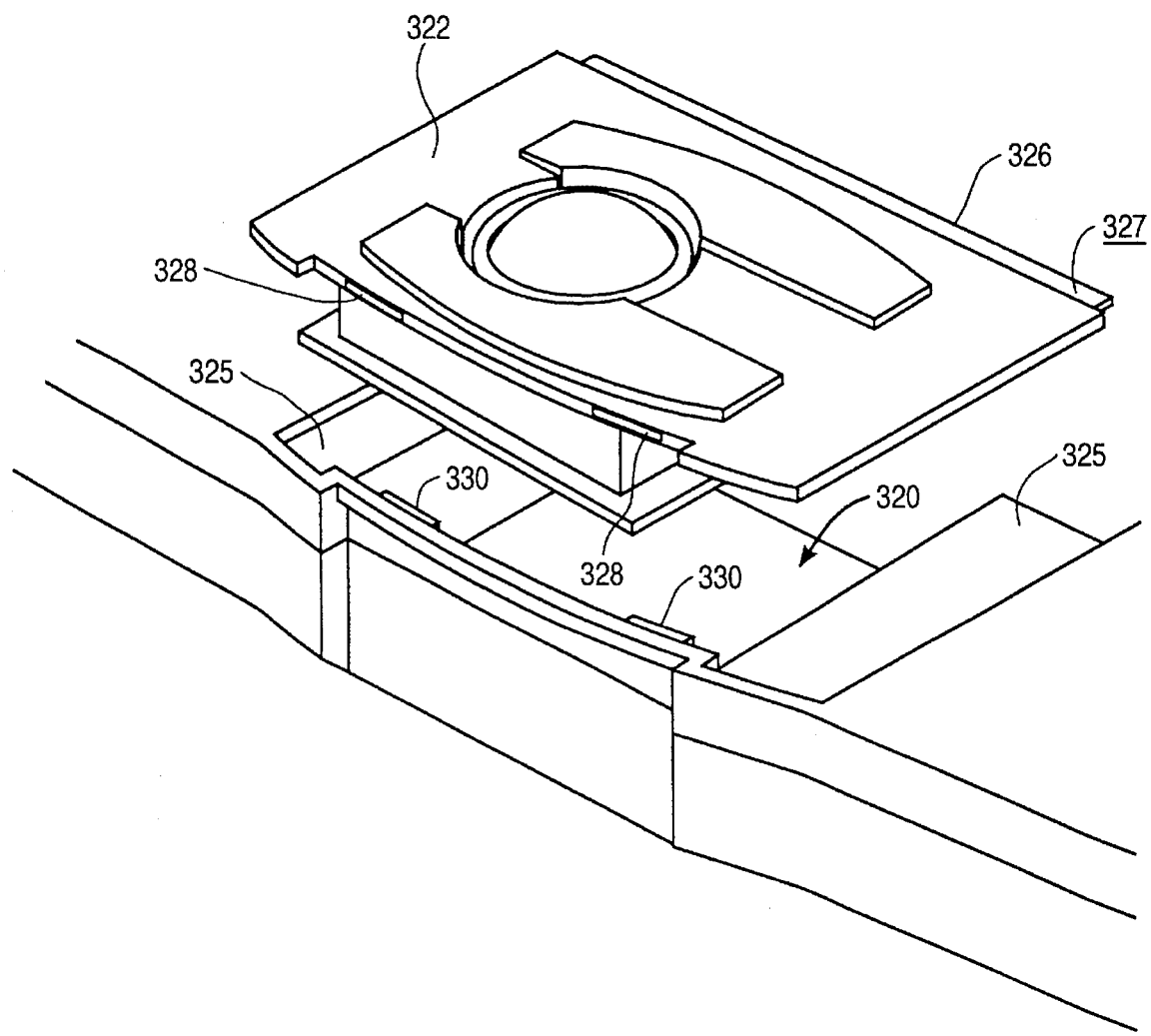
FIG. 5 is an enlarged view of the trackball module and socket of the notebook computer of FIG. 3.

FIG. 5 is an enlarged view showing the trackball module separated from the remaining portions of the computer. As can be seen, the body of the computer is formed with a socket 320 for accommodating the trackball mechanism. The trackball module is formed with a top plate 322, and the body portion surrounding the socket is relieved to define a spaced pair of shoulder regions 325 that are contacted by the lower surface of plate 322. Top plate 322 is formed with an extension 326 along its edge that is nearest to the keyboard. This extension has an upper surface 327 that is parallel to and slightly below the upper surface of plate 322. The top plate is formed with a pair of mortises 328 in its edge that is remote from the keyboard. Mortises 328 are formed complementarily with respect to a pair of tenons 330, which are formed on the computer body and extend into the socket region. When the trackball module is installed, mortises 328 are engaged by tenons 330, and extension 326 is captured under the keyboard. Once the keyboard is locked closed, the trackball module is entirely stabilized within the socket.

Figure 6:
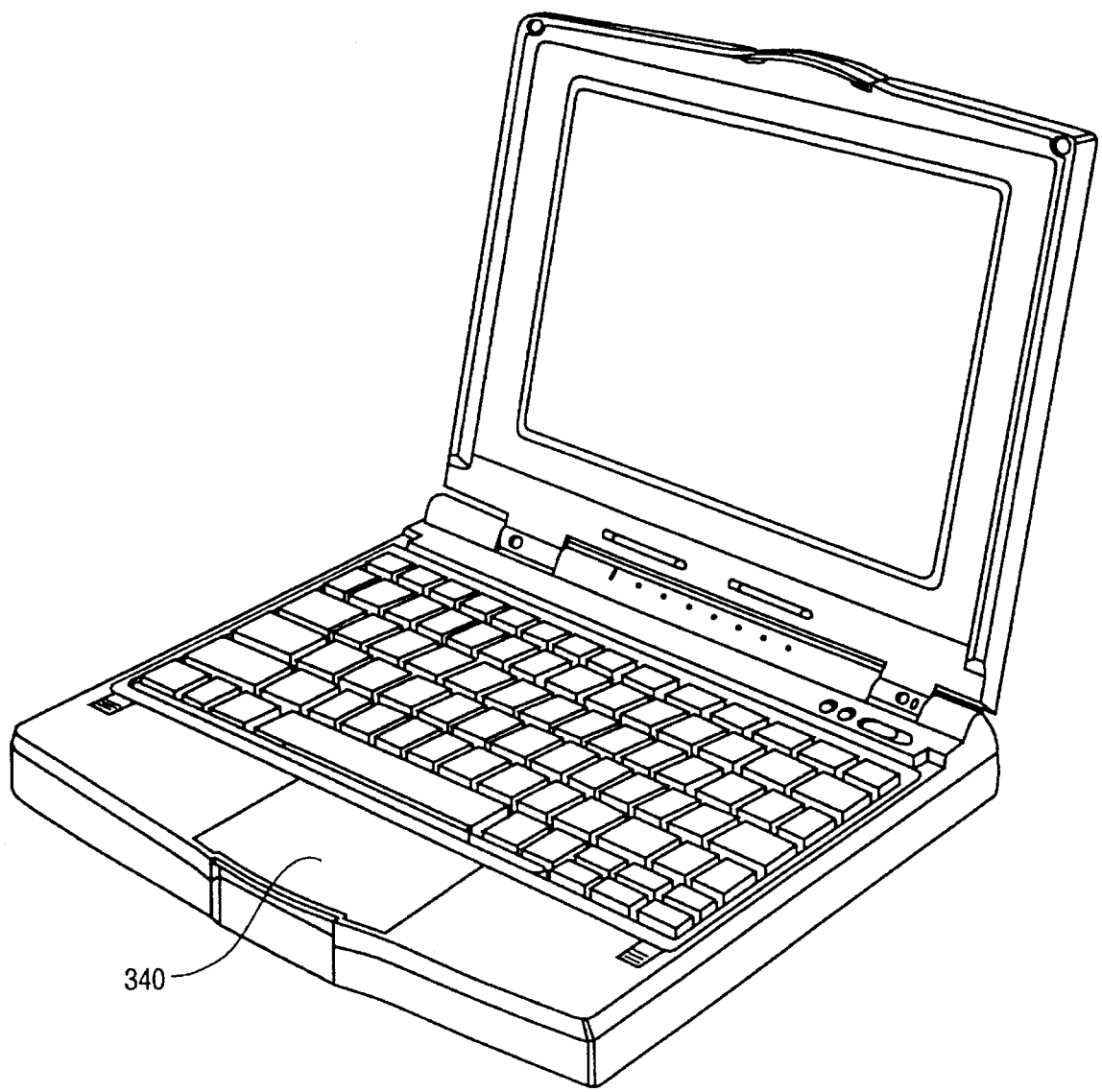
FIG. 6 shows the notebook computer of FIG. 3 with the trackball module removed and a cover plate installed in its place.

Thus, it can be seen that the removable trackball module configuration of the present invention provides a number of advantages. Because the trackball can be easily removed or installed, customers have the option of purchasing the notebook computer with or without the trackball. FIG. 6 is a perspective view of the notebook computer of FIG. 3 with no trackball installed. Rather, a plain plate 340 is provided, having the same periphery and thickness as top plate 322, and being formed with the same extension and mortises. Plate 340 engages shoulders 325, tenons 330, and the lower surface of the keyboard in the same fashion as top plate 322 of the trackball module. Thus, the plain plate allows the notebook computer to retain an intact appearance, and the notebook computer can work normally without the trackball.

Figure 1:
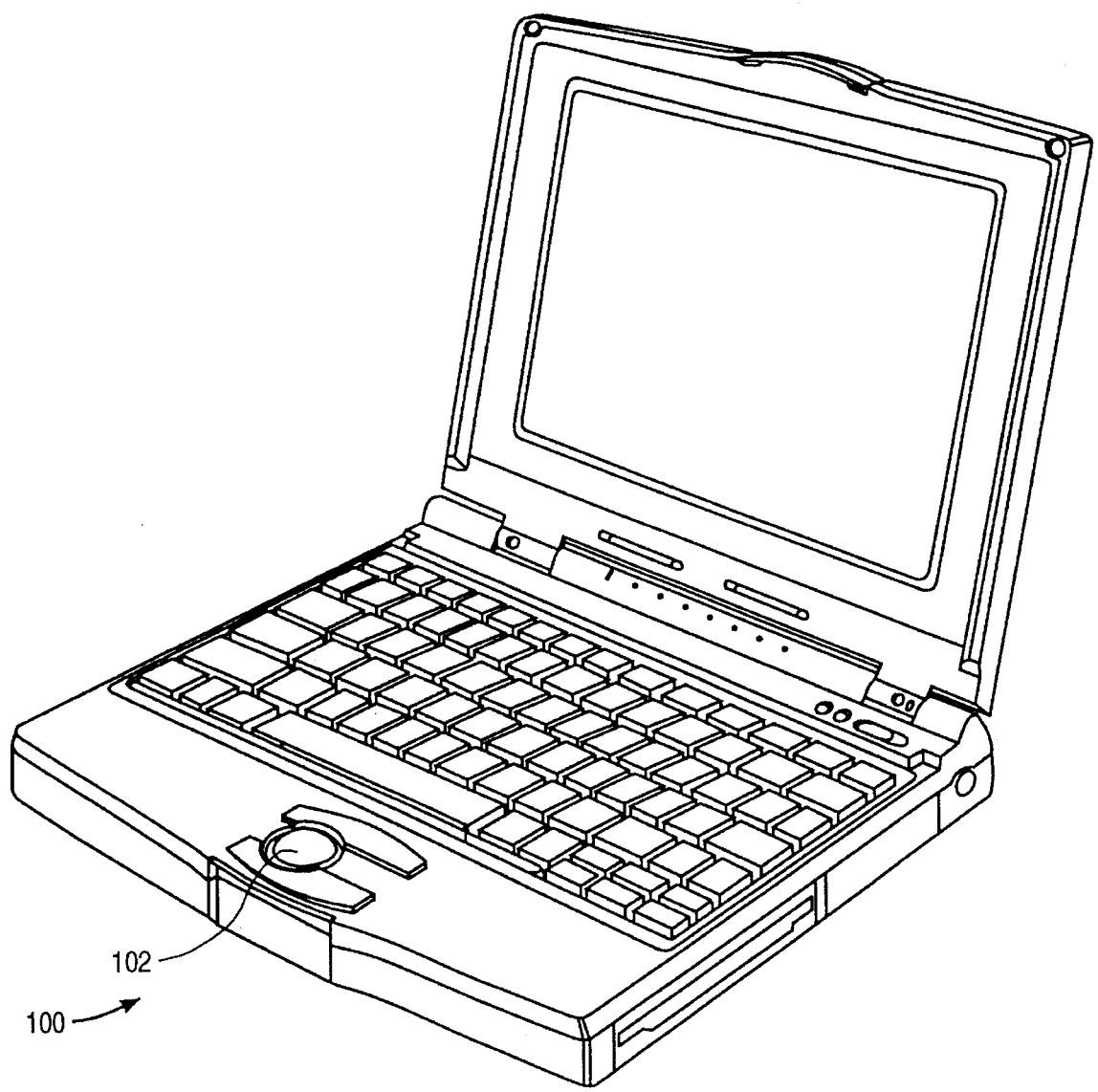
FIG. 1 shows a prior art notebook computer with a non-separable built-in trackball.
Figure 2A:
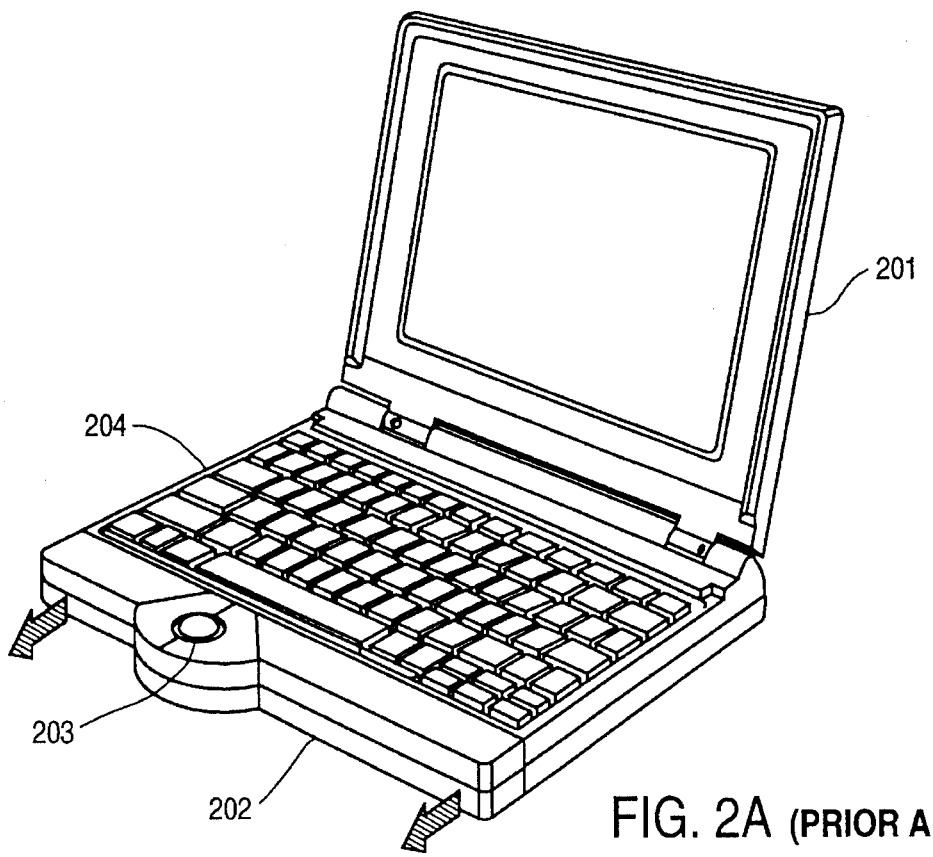
FIGS. 2A and 2B show another prior art notebook computer with a separable trackball assembly.
Figure 2B:
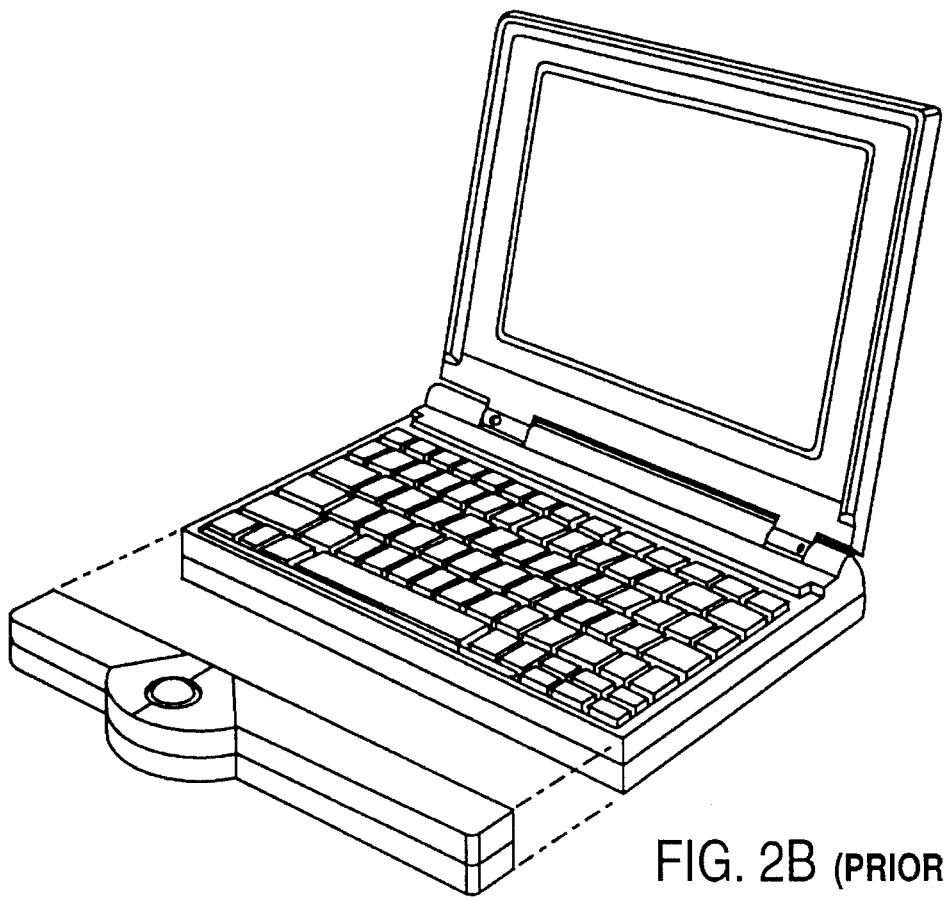

Furthermore, if a trackball problem arises, the user can simply take the trackball module out of the computer and send it for repair, instead of having to bring the whole computer to a shop. In the meantime, the user can still use the computer. Moreover, the trackball of the present invention adds little extra weight to the notebook computer system, unlike the prior art product shown in FIG. 2.

While the above is a complete description of the preferred embodiments of the present invention, various modifications, alternative constructions, and equivalents can be used. Therefore, the above description and illustration should not be taken as limiting the scope of the invention which is defined by the claims.

What is claimed is:

1. A notebook computer system comprising:

a body formed with a socket;

a keyboard rotatably engaged with the body, the keyboard being rotatable between a first position that is fully engaged with the body and a second position wherein at least a portion of the keyboard is separated from the body; and a trackball module having a locking element that engages the keyboard so that the trackball module is captured by the keyboard when the trackball is installed in the socket and the keyboard is in the first position;

wherein the trackball is removable from the socket and separable from the body and the keyboard when the keyboard is in the second position.

2. The notebook computer system of claim 1 wherein the socket further comprises a first stabilizing means for holding the trackball in the socket.

3. The notebook computer system of claim 2 wherein the trackball module further comprises a second stabilizing means for engaging the first stabilizing means.

4. The notebook computer system of claim 3 wherein the second stabilizing means is a recess means.

5. The notebook computer system of claim 4 wherein the recess means is a plurality of mortises.

6. The notebook computer system of claim 2 wherein the first stabilizing means is a projection means.

7. The notebook computer system of claim 6 wherein the projection means is a plurality of tenons.

8. A notebook computer system comprising:

a body formed with a socket;

a keyboard coupled to the body, the keyboard being movable between a first position that is fully engaged with the body and a second position wherein at least a portion of the keyboard is separated from the body; and a trackball module having a locking element that engages the keyboard so that the trackball module is captured by the keyboard when the trackball is installed in the socket and the keyboard is in the first position;

wherein at least a portion of the socket extends from under the keyboard when the keyboard is in the first position, and the trackball is removable from the socket and separable from the body and the keyboard when the keyboard is in the second position; and wherein the locking element is a horizontal plate protruding out of the trackball module.

9. A notebook computer system as claimed in claim 8, wherein the keyboard is rotatably engaged with the body, and the keyboard rotates between the first position and the second position.

10. A notebook computer system comprising:

a keyboard;

a normally horizontal body supporting the keyboard, the body having a normally horizontal portion with an upper surface extending in a direction away from the keyboard;

the normally horizontal portion being formed with a socket extending below the upper surface;

a trackball module sized to fit into the socket; and a mechanism for removably mounting the trackball module in the socket;

wherein the notebook computer is operable with the trackball module when the trackball module is installed in the socket; and wherein the notebook computer is operable without the trackball module when the trackball module is removed from the socket.

11. The notebook computer system of claim 10 wherein the keyboard, the body, and the trackball module include engagement portions that cooperate so as to define the mechanism.

12. The notebook computer system of claim 11 wherein:

the keyboard is rotatably engaged with and releasably locked against the body; and the trackball module engages a bottom surface of the keyboard.

13. The notebook computer system of claim 11 wherein the body and the trackball module engage via a plurality of mertises and tenons.

14. The notebook computer system of claim 13 wherein:

the plurality of mortises are formed in the trackball module; and the tenons are formed on the body.

15. The notebook computer system of claim 10 wherein:

the socket is adapted to alternatively receive a plate when the trackball module is removed; and the notebook computer is operable with the trackball module removed and the plate installed.

16. The notebook computer system of claim 10 further comprising:

a plate sized to fit over the socket, the plate having a plate upper surface;

wherein the mechanism removably receives the plate over the socket with the upper surface of the body substantially flush with the plate upper surface.

17. The notebook computer system of claim 10 wherein at least a portion of the socket extends in the direction of the first upper surface beyond the keyboard.

18. The notebook computer system of claim 10 further comprising a cable connector which provides for data communication between the trackball module and the body when the trackball is installed, and which is separated when the trackball module is removed.

19. The notebook computer system of claim 10, wherein the mechanism engages the trackball so as to capture the trackball in the socket when the keyboard is positioned for use.

* * * * *